(No Model.) 3 Sheets—Sheet 1.

C. H. FISHER.
BEARING FOR SPINNING SPINDLES, &c.

No. 434,924. Patented Aug. 26, 1890.

WITNESSES.
Melvin B. Smith
George A. Nelson

INVENTOR:
Charles H. Fisher.

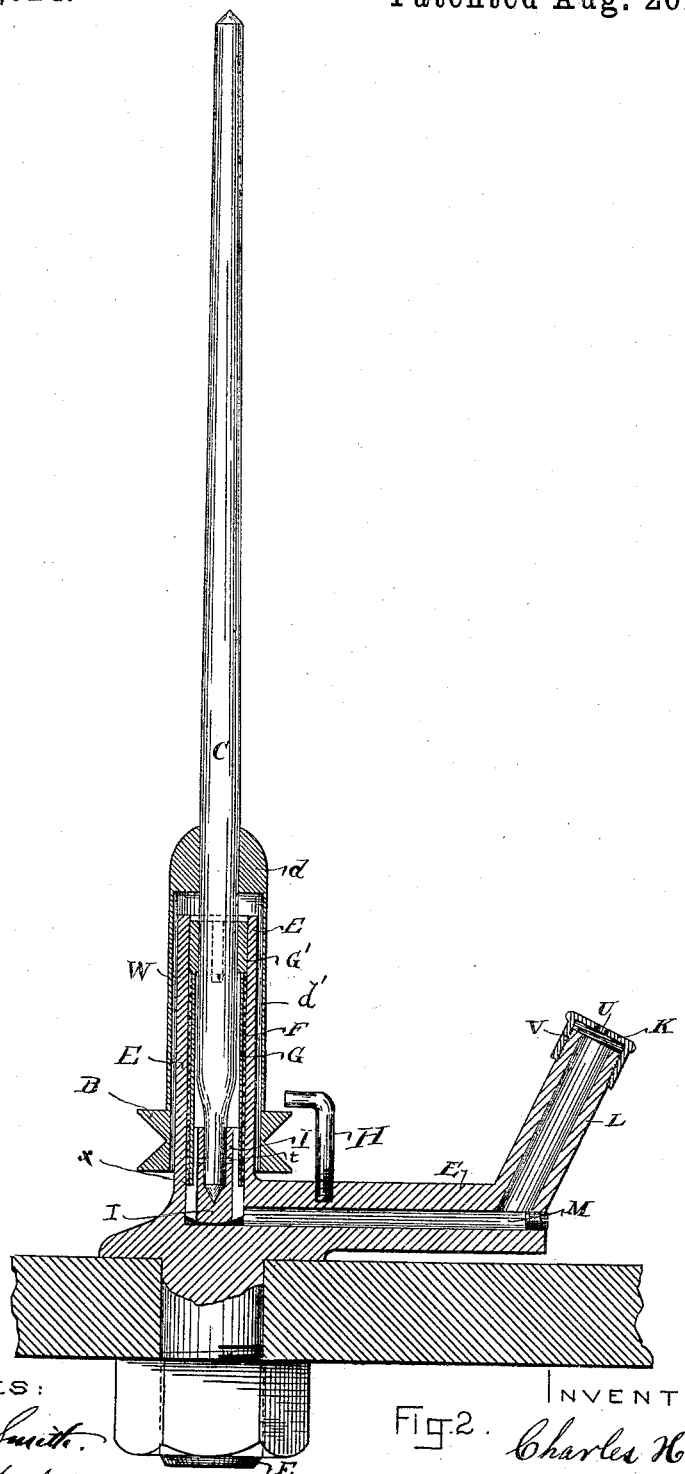

(No Model.) 3 Sheets—Sheet 3.
C. H. FISHER.
BEARING FOR SPINNING SPINDLES, &c.
No. 434,924. Patented Aug. 26, 1890.
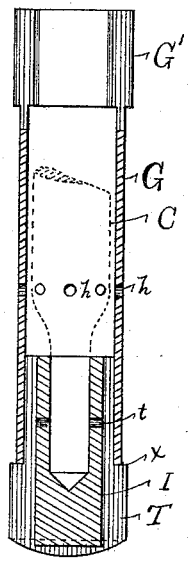
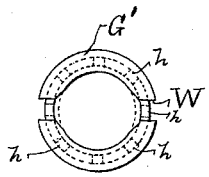
Fig. 5.
WITNESSES:
Henry O. Brooks
M. L. Allen
INVENTOR:
Charles H. Fisher.

UNITED STATES PATENT OFFICE.

CHARLES H. FISHER, OF LOWELL, MASSACHUSETTS.

BEARING FOR SPINNING-SPINDLES, &c.

SPECIFICATION forming part of Letters Patent No. 434,924, dated August 26, 1890.

Application filed October 2, 1885. Renewed November 17, 1887. Serial No. 255,417. (No model.)

*To all whom it may concern:*

Be it known that I, CHARLES H. FISHER, a citizen of the United States, residing at Lowell, in the county of Middlesex and State of Massachusetts, have invented a new and useful Improvement in Bearings for Spinning-Spindles and similar Structures, of which the following is a specification.

My invention relates to that class of journals and bearings where the journal is very small and is exposed to a very light pressure, and where it continuously rotates for extended intervals of time at a very great velocity; and the object of my invention is to furnish journals which will require less power for rotating them than is required by those which are now generally used under these conditions.

My invention is embodied in the journals and bearings which are represented by the accompanying drawings, in which—

Figure 1:
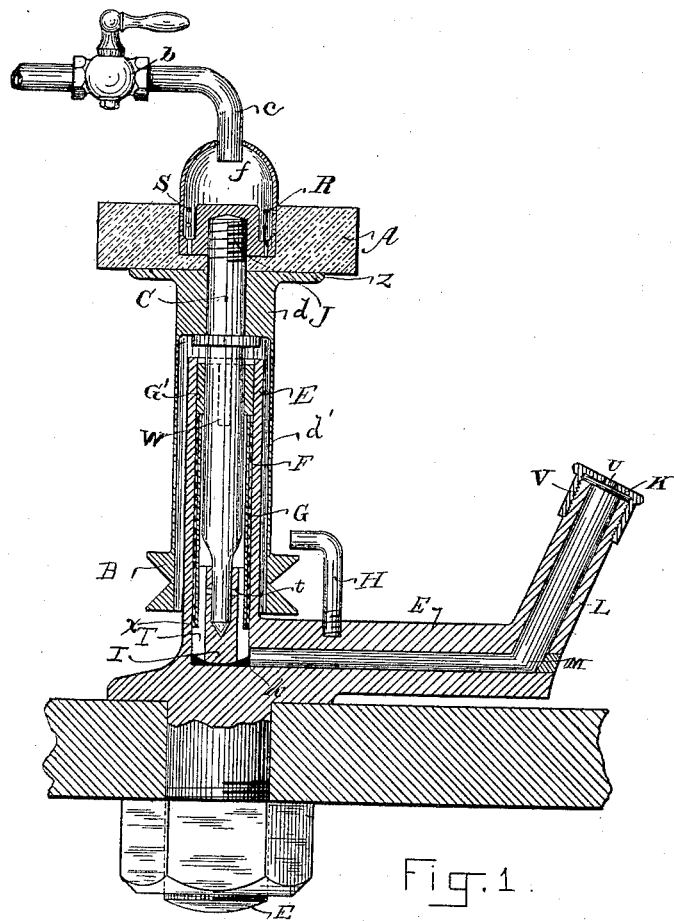
Figure 4:
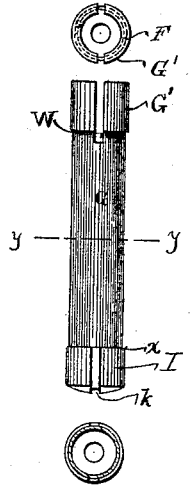
Figure 3:
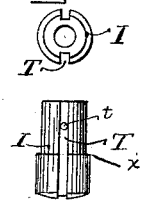

Figure 1 is a sectional elevation of an atomizer provided with the improved journal and bearing. Fig. 2 is a sectional elevation of a spinning-spindle having a journal and bearing of the improved kind. Fig. 3 is a plan and an elevation of the step which supports the improved journal. Fig. 4 is a plan, an elevation, and a section, at the line $y\ y$, of a bolster-tube and step which I employ in my invention. Fig. 5 is an enlarged plan and central vertical section of the said bolster-tube and step, showing some details of their construction more plainly than is possible upon a smaller scale.

Similar letters of reference refer to similar parts throughout the several views.

Fig. 1 represents an atomizer adapted for atomizing water. The water is supplied through the pipe $c$ in an amount which may be regulated by the cock $b$. The water passes into the cap $f$, whence it is forced by atmospheric pressure and centrifugal force through the perforations S and R into a porous disk A, which is clamped to the flange Z by the cap $f$ and the screw J. This device must rotate at a very high speed to properly atomize water, and it requires a correspondingly good journal and bearing to support it in order that it may do its work for long periods of time with but little attention.

Fig. 2 represents a ring spinning-spindle, which is intended to be run as quickly as ten thousand turns per minute, and with this class of spindles it is very desirable to reduce the amount of power required to drive them as much as possible.

Figs. 3 and 4 are detached views of the means which are used to support the spindle C. The upper journal of the said spindle is supported in the annular projection G' of the bolster-supporting tube G. The interior diameter of the projection G' is shown as being less than that of the tube G, and its exterior diameter as greater than that of the tube G. The projection G' is also provided with one or more slots W, through which oil is introduced to its interior surface when it is in use. The tube G surrounds a portion of the step I at its lower end and rests upon the shoulder $x$ thereof. The step I and the projection G' fit closely within the bolster-case E, and thereby prevent the spindle C from being materially deflected from its proper position.

To the bolster-case E is connected by the oil-passage M the oil-reservoir L, provided with a cap K, having a central air-hole U and the screw-thread V or other suitable means of retaining it upon the said oil-reservoir. This oil-reservoir is simply for holding a considerable supply of oil in communication with the interior of the bolster-case, and any of the well-known substitutes for this form of reservoir may be equivalently used therefor.

Since by its construction the tube G cannot fit closely within the bolster-case E, a space is left between the said tube and case through which oil is raised by capillary attraction to the upper bearing G'. I usually fill this space by the wick F, securing the same upon the outer surface of the tube G, and carrying portions of the wick into the slots W of the bearing G', although the wick in the slots W and even upon the tube G itself may be sometimes dispensed with, when the oil-passages are made sufficiently small to allow the oil to be supplied from the lower part of the casing E to the said bearing G' by capillary attraction. In either case the spindle C, where it runs in the bearing G', will be lubricated. The inner diameter of the projection G' is made less than that of the tube G in order to enlarge the space between the spindle and the tube G, and thus to prevent the oil from being carried, aided by capillary attraction, in a flood to the upper bearing of the spindle, as it has hitherto been carried in spindles of this class when two separate bearings have been sought to be maintained for the spindle.

In order that oil may freely pass from the bolster-casing E to the interior bearing of the step I and to the space between the said case and the tube G, grooves T are made in the surface of the step I in such a way that its fit in the bolster-case may not be impaired, and conduits or ducts $t$ are made leading from the said grooves to the interior spindle-bearing of the step.

Whether it be filled with a portion of the wick or not, I prefer to chamfer off the edges of the slot W, on the inside of the bearing G' on both sides of the slot W, in order that oil may not be scraped from the said journal by these edges, and in order that oil may be drawn in between the spindle C and the bearing G' in case the spindle C revolves in either direction. This construction is plainly shown in the plan view in Fig. 5, where the spindle C is shown by a dotted line.

Another important advantage secured by the use of the slot W with its chamfered edges is the formation of a longitudinal storage-groove in the upper or bolster bearing, which groove is wholly or partially filled with lubricating material led thereto by capillary attraction and the action of the spindle C. These grooves tend to keep the upper bearing of the spindle well lubricated, thereby decreasing the resistance which said bearing offers to the turning of the spindle, and serve as a reservoir for the lubricant carried from the lower part of the bolster-case, whereby the intermediate portions of the spindle are to some extent freed from the necessity of revolving in a body of the lubricant. These grooves may be of any convenient or desirable number, two being the number chosen for illustration, and the size and shape thereof may be varied by making their chamfered sides planes which are substantially parallel to the axis of the spindle, as shown in Fig. 5, and tangent to a greater or smaller cylinder, as desired. This part of my invention may be used with bearings and spindles which vary to a considerable extent from those illustrated.

I prefer to have the oil in the reservoir L maintained nearly on a level with the top of the step I, in order that the oil may not be carried upward upon the spindle C by centrifugal force. I sometimes pierce the sides of the tube G with holes, in order to allow the escape into the wick F of any oil which might be carried up the spindle C. I prefer to make these holes, as shown in Fig. 5 by the letter $h$, in that part of the tube G, which is upon a level with the lowest portion of the spindle, which is unreduced in diameter by the formation of the lower journal thereof.

To the spindle C is attached by the boss $d$ and sleeve $d'$ a pulley B, upon which a band, which rotates the said pulley and the said spindle at a very high velocity, is intended to run. In Figs. 1 and 2, the bent screw H keeps the pulley B in its proper place. I prefer to make the length of the sleeve $d'$ such as to bring the plane of the band-groove in such a position that it shall cross the lower and smaller journal of the spindle C, as shown, although it is not necessary to do this in order to secure substantial improvements over previous structures or in order that the spindle may properly perform its functions.

I do not here claim the atomizer shown in Fig. 1, since that invention forms the subject of another application for Letters Patent for an atomizer, filed September 30, 1885, Serial No. 178,676.

What I do here claim as new, and desire to secure by Letters Patent, is—

1. The bolster-casing E, combined with the step closely fitting therein and having the interior spindle-bearing, oil-ducts leading from the said casing to the said interior bearing and the shoulder upon its exterior surface, the bolster-supporting tube surrounding a portion of the said step and resting upon the said shoulder and provided with the annular slotted projection G', fitting closely within the said bolster-case, and means of carrying oil to the slots in the projection G' from the lower part of the said bolster-case by capillary attraction, substantially as described, and for the purposes set forth.

2. The bolster-casing E, combined with the step closely fitting therein and having the interior spindle-bearing, the oil-ducts leading from the said casing to the said interior bearing and the shoulder upon its exterior surface, the bolster-supporting tube surrounding a portion of the said step and resting upon the said shoulder and provided with the annular slotted projection G', fitting closely within the said bolster-case, and the wick for carrying oil from the lower part of the said case to the slots in the projection G', substantially as described, and for the purposes set forth.

3. The bolster-casing E, combined with the step closely fitting therein and provided with the exterior shoulder, the interior bearing and ducts for leading oil from the said casing to the said bearing, the bolster-supporting tube surrounding a portion of the said step and resting on the said shoulder and provided with the annular slotted projection G', fitting closely within the said bolster-casing, means of carrying oil by capillary attraction from the lower portion of the said bolster-casing to the slots in the projection G', a spindle having a small bearing, which runs in the said step, and a larger bearing running in the projection G', and a hollow pulley connected to the said spindle and encompassing the bolster-casing and provided with a band-groove whose plane crosses the said small spindle-bearing, substantially as described, and for the purposes set forth.

4. The combination, with a bolster-casing, of a bolster-bearing supported in the upper part thereof and provided with longitudinal oil-holding grooves with inclined sides, a step within said bolster-casing, a spindle supported in said step and bolster-bearing, and a whirl attached to said spindle, substantially as described, and for the purposes specified.

5. The combination, with a bolster-casing, of a step within said casing, a bolster-bearing at the upper part of said casing, said bolster-bearing having longitudinal oil-storing grooves with inclined sides formed therein, a spindle supported in said step and bolster-bearing and provided with a whirl attached thereto, and means for leading oil from the lower part of said bolster-casing to said oil-storing grooves by capillary attraction, substantially as described, and for the purposes specified.

CHARLES H. FISHER.

Witnesses:
GEORGE A. NELSON,
WM. H. ANDERSON.